US008112383B2

(12) United States Patent
Acheson et al.

(10) Patent No.: US 8,112,383 B2
(45) Date of Patent: Feb. 7, 2012

(54) SYSTEMS AND METHODS FOR A DATABASE ENGINE IN-PROCESS DATA PROVIDER

(75) Inventors: Alazel Acheson, Redmond, WA (US); Shrinivas Ashwin, Sammamish, WA (US); Jose A. Blakeley, Redmond, WA (US); Peter Carlin, Seattle, WA (US); Erik Ismert, Shoreline, WA (US); Christian Kleinerman, Bellevue, WA (US); Ganapathy Subramaniam Krishnamoorthy, Issaquah, WA (US); Girkumar Nair, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/776,370

(22) Filed: Feb. 10, 2004

(65) Prior Publication Data

US 2005/0187944 A1    Aug. 25, 2005

(51) Int. Cl.
    G06F 7/00    (2006.01)
    G06F 17/30   (2006.01)
(52) U.S. Cl. ..................................... 707/102; 707/718
(58) Field of Classification Search ............... 707/3, 103;
                                                 345/700; 717/126
    See application file for complete search history.

(56) References Cited

U.S. PATENT DOCUMENTS

| | | | | |
|---|---|---|---|---|
| 5,900,870 A | | 5/1999 | Malone et al. ................ 345/333 |
| 5,999,943 A | * | 12/1999 | Nori et al. ................... 707/104.1 |
| 6,047,291 A | | 4/2000 | Anderson et al. ............. 707/103 |
| 6,108,004 A | | 8/2000 | Medl ............................ 345/346 |
| 6,112,024 A | | 8/2000 | Almond et al. ................ 395/703 |
| 6,199,195 B1 | | 3/2001 | Goodwin et al. ................. 717/1 |
| 6,301,579 B1 | * | 10/2001 | Becker ........................ 707/102 |
| 6,338,056 B1 | | 1/2002 | Dessloch et al. ................. 707/2 |
| 6,363,398 B1 | * | 3/2002 | Andersen .................. 707/103 R |
| 6,370,541 B1 | | 4/2002 | Chou et al. .................... 707/103 |
| 6,477,564 B1 | | 11/2002 | Freyssinet et al. ............ 709/202 |
| 6,519,597 B1 | | 2/2003 | Cheng et al. .................... 707/10 |
| 6,556,983 B1 | | 4/2003 | Altschuler et al. .............. 706/55 |
| 6,578,046 B2 | | 6/2003 | Chang et al. .................. 707/103 |
| 6,615,219 B1 | * | 9/2003 | Bruso et al. ................... 707/102 |
| 6,671,757 B1 | | 12/2003 | Multer et al. ................. 710/100 |
| 6,681,383 B1 | * | 1/2004 | Pastor et al. .................. 717/126 |
| 6,694,336 B1 | | 2/2004 | Multer et al. ................. 707/201 |
| 6,735,598 B1 | * | 5/2004 | Srivastava ................. 707/103 R |
| 6,738,789 B2 | | 5/2004 | Multer et al. ................. 707/201 |
| 6,757,696 B2 | | 6/2004 | Multer et al. ................. 707/201 |
| 6,772,178 B2 | | 8/2004 | Mandal et al. ................ 707/204 |
| 7,020,660 B2 | * | 3/2006 | Woodring ................. 707/103 R |

(Continued)

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner* — Sathyanarayan Pannala
(74) *Attorney, Agent, or Firm* — Woodcock Washburn LLP

(57) ABSTRACT

Various embodiments of the present invention enable functions, procedures, and triggers to be written in any of the .NET languages and executed by the RDBMS. User code can access data from the local or other SQL servers using the SQL Programming Model and both the SqlServer or SqlClient implementations respectively. Moreover, to improve upon the previous extensibility mechanism, a set of APIs (commonly known as "the in-process provider" or "inproc provider") is utilized to provide efficient and easy to use data access while running inproc, a data access API that is an implementation of the ADO.net programming model.

17 Claims, 5 Drawing Sheets

U.S. PATENT DOCUMENTS

| | | | |
|---|---|---|---|
| 7,159,007 B2 * | 1/2007 | Stawikowski | 709/202 |
| 7,376,755 B2 * | 5/2008 | Pandya | 709/250 |
| 2002/0059204 A1 * | 5/2002 | Harris | 707/3 |
| 2002/0091702 A1 | 7/2002 | Mullins | 707/100 |
| 2002/0143521 A1 | 10/2002 | Call | 704/1 |
| 2002/0152422 A1 | 10/2002 | Sharma et al. | 714/13 |
| 2002/0198891 A1 | 12/2002 | Li et al. | 707/102 |
| 2003/0158839 A1 | 8/2003 | Faybishenko et al. | 707/3 |
| 2004/0233232 A1 * | 11/2004 | Iborra et al. | 345/700 |

OTHER PUBLICATIONS

Beard, et al., "Multilevel and Graphical Views of Metadata", *Research and Technology Advances in Digital Libraries*, 1998, 256-265.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen*, (ed); North Holland Publishing Company: 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al., "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series, vol. 3, Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA '86*, 1986, 21, 406-416.

Kiesling, R., "ODBC in UNIX Environments", *Dr. Dobb's Journal*, Dec. 2002, 27(12), 16-22.

King et al, "TriStarp- An Investigation into the Implementation and Exploitation of Binary Relational Storage Structures", *Proc. 8.sup.th BNCOD(British National Conference on Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2), 403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document* 93.7.5, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", DocEng'Ol, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Beitner, N.D. et al., "Multimedia Support and Authoring in Microcosm: An Extended Model", Department of Electronics and Computer Science, University of Southampton, 12 pages, 1994.

Chryssosiomos, et al. "Geometric Modeling Issues in Computer Aided Design of Marine Structures", *MTS Journal*, 22(2) pp. 15-33, 1988.

Nijssen, G.M. et al., "Conceptual Schema and Relational Database Design, A Fact Oriented Approach", Department of Computer Science, University of Queensland, Prentice Hall, 10-33, 42-43, 48-51, 156-170, 1989.

Anonymous: "New SQL Capabilities in Oracle Database 10g," An Oracle White Paper, [Online], Nov. 1, 2003, pp. 1-31, XP002524889 Retrieved from the Internet: URL:http://www.orcle.com/technology/products/database/application_development/pdf/TWP_AppDev_SQL_NewFeatures_10gR1_1103.pdg> [retrieved on Apr. 22, 2009].

In the United States Patent and Trademark Office, Non Final Action in re: U.S. Appl. No. 10/776,664, filed Feb. 10, 2004, dated Jul. 18, 2006, 10 pages.

In the United States Patent and Trademark Office, Final Action in re: U.S. Appl. No. 10/776,664, filed Feb. 10, 2004, dated Jan. 16, 2007, 10 pages.

In the United States Patent and Trademark Office, Advisory Action in re: U.S. Appl. No. 10/776,664, filed Feb. 10, 2004, dated Jun. 28, 2007, 3 pages.

In the United States Patent and Trademark Office, Non Final Action in re: U.S. Appl. No. 10/776,664, filed Feb. 10, 2004, dated Sep. 26, 2007, 7 pages.

* cited by examiner

SYSTEMS AND METHODS FOR A DATABASE ENGINE IN-PROCESS DATA PROVIDER

CROSS-REFERENCE(S) TO RELATED APPLICATION(S)

The present application is related by subject matter to the inventions disclosed in the following commonly assigned application: U.S. patent application Ser. No. 10/776,664, filed on Feb. 10, 2004, now U.S. Pat. No. 7,437,346, issued on Oct. 14, 2008, entitled "SYSTEMS AND METHODS FOR A LARGE OBJECT INFRASTRUCTURE IN A DATABASE SYSTEM", the entirety of which is hereby incorporated herein by reference.

FIELD OF THE INVENTION

The present invention generally relates to the field of database systems and, more specifically, to systems and methods for enabling functions, procedures, and triggers for a database to be written in any of the .NET languages.

BACKGROUND OF THE INVENTION

Open Database Connectivity (ODBC) is an open standard application programming interface (API) for accessing a database. By using ODBC statements in a program, you can access files in a number of different databases, including Access, dBase, DB2, Excel, and Text. In addition to the ODBC software, a separate module or driver is needed for each database to be accessed. The main proponent and supplier of ODBC programming support is Microsoft. ODBC is based on and closely aligned with The Open Group standard Structured Query Language (SQL) Call-Level Interface. It allows programs to use SQL requests that will access databases without having to know the proprietary interfaces to the databases. ODBC handles the SQL request and converts it into a request the individual database system understands.

Before an ODBC application can submit an SQL statement, it must allocate a statement handle for the statement. To allocate a statement handle, an application declares a variable of type HSTMT (for example, the application could use the declaration: HSTMT hstmt1) and then calls SQLAllocStmt to pass it the address of the variable and the connected HDBC with which to associate the statement. The driver allocates memory to store information about the statement, associates the statement handle with the hdbc, and returns the statement handle in the variable.

OLEDB is an application program interface (API) for access to different data sources. OLEDB includes not only the Structured Query Language (SQL) capabilities of the Microsoft-sponsored standard data interface Open Database Connectivity (ODBC) but also includes access to data other than SQL data. As a design from Microsoft's Component Object Model (COM), OLEDB is a set of methods (or routines) for reading and writing data. The objects in OLEDB consist mainly of a data source object, a session object, a command object, and a rowset object. An application using OLEDB would use this request sequence: (i) initialize OLE; (ii) connect to a data source; (iii) issue a command; (iv) process the results; and (v) release the data source object and uninitialize OLE. (While OLE once stood for "Object Link Embedding" and "DB" for database, many skilled artisans no longer ascribes these meanings to the letters "OLE" and "DB.")

In OLEDB, ICommand contains methods to execute commands. A command can be executed many times, and the parameter values can vary. This interface is mandatory on commands. A command object contains a single text command, which is specified through ICommandText, an interface that is mandatory on commands, and a command object can have only one text command. When the command text is specified through ICommandText::SetCommandText, it replaces the existing command text.

ActiveX Data Object (ADO) is an application program interface from Microsoft that lets a programmer writing Windows applications get access to a relational or non-relational database from both Microsoft and other database providers. For example, to write a program that would provide users of a Web site with data from an IBM DB2 database or an Oracle database, one could include ADO program statements in an HTML file that are then identified as an Active Server Page; then, when a user requested the page from the Web site, the page sent back would include appropriate data from a database, obtained using ADO code.

OLEDB is the underlying system service that a programmer using ADO is actually using. A feature of ADO, Remote Data Service, supports "data-aware" ActiveX controls in Web pages and efficient client-side caches. As part of ActiveX, ADO is also part of Microsoft's overall Component Object Model (COM), its component-oriented framework for putting programs together. ADO instruction objects are termed commands as the usual intention is for these commands to be performed immediately. The most elemental responsibility of a command object is to perform the operations intended by an instruction. Additional responsibilities might include: undoing operations; performing the operations in a different context, possibly in a different process, machine, or time schedule (batching); pr simulating the effect of the operations. For programming languages that do not provide threading, running batched CommandObjects can provide pseudo-threading.

ADO.net is a set of classes in .NET that allows for data access. ADO.net is comprised of classes found in the System.Data namespace that encapsulate data access for distributed applications. However, rather than simply mapping the existing ADO object model to .NET to provide a managed interface to OLEDB and SQL Server, ADO.net changes the way data is stored and marshaled within and between applications. The primary reason ADO.net redefines this architecture is that most applications developed today can benefit from the scalability and flexibility of being able to distribute data across the Internet in a disconnected fashion.

Because the classic ADO model was developed primarily with continuously connected access in mind, creating distributed applications with it is somewhat limiting. A typical example is the need to move data through a Recordset object between tiers in a distributed application. To accomplish this in classic ADO you have to specifically create a disconnected Recordset using a combination of properties including cursor location, cursor type, and lock type. In addition, because the Recordset is represented in a proprietary binary format, you have to rely on COM marshalling code built into OLEDB to allow the Recordset to be passed by value (ByVal) to another component or client code. This architecture also runs into problems when attempting to pass recordsets through firewalls because these system level requests are often denied. On the other hand, if you elected not to use disconnected recordsets, you had to devise your own scheme to represent the data using Variant arrays, delimited within a string, or saved as tabular XML using the Save method (although the latter option is really only viable when using ADO 2.5 and higher). Obviously these approaches have their downside because they run into problems with performance and maintainability not to mention interoperability between platforms. In addition, the classic ADO model doesn't handle hierarchical data particularly well. Although it is possible to create hierarchical recordsets using the Microsoft data shape provider, it is not simple and is therefore not often used. Typically JOIN clauses are used inside stored procedures or inline SQL to retrieve data from multiple tables. However, this does not allow you to assemble data from multiple data sources and easily determine from where the data comes. As a result, classic ADO provides a flat view of data that is not strongly typed. To alleviate these problems, ADO.net is built from the ground up for distributed applications used in today's disconnected scenarios. For example, the central class in ADO.net is the DataSet, which can be thought of as an in-memory XML database that stores related tables, relationships, and constraints. As you'll see, the DataSet is the primary mechanism used in VB.NET applications to cache data and pass it between tiers in a distributed application thereby alleviating the need to rely on proprietary schemes or COM marshalling.

Using XML alleviates several of the burdens of classic ADO. For example, by storing the data as XML it can easily pass through firewalls without special configuration. In addition, by storing related tables and representing the relationships between those tables the DataSet can store data hierarchically allowing for the easy manipulation of parent/child relationships. The self-describing nature of XML combined with the object-oriented nature of VB.NET also allows for direct programmatic access to the data in a DataSet in a strongly typed fashion. In other words, the data need not be accessed using a tables, rows, and columns metaphor but can be accessed in terms of the definition of the data that can be type checked by the compiler. Furthermore, this disconnected model combined with connection pooling schemes frees resources on the database server more quickly, allowing applications to scale by not holding on to expensive database connections and locks.

Web services (sometimes called application services) are services that are made available from a business's Web server for Web users or other Web-connected programs. Providers of Web services are generally known as application service providers. Web services range from such major services as storage management and customer relationship management (CRM) down to much more limited services such as the furnishing of a stock quote and the checking of bids for an auction item. The accelerating creation and availability of these services is a major Web trend. Users can access some Web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become Web services. Besides the standardization and wide availability to users and businesses of the Internet itself, Web services are also increasingly enabled by the use of the Extensible Markup Language (XML) as a means of standardizing data formats and exchanging data. XML is the foundation for the Web Services Description Language (WSDL).

.NET is a collection of programming support for web services, the ability to use remote services rather than your own computer for various services. The purpose of .NET is to provide individual and business users with a seamlessly interoperable interface for applications and computing devices and to make computing activities increasingly browser-oriented. The .NET platform includes servers; building-block services, such as web-based data storage; and device software.

The .NET Common Language Runtime (CLR) is an execution platform that manages the execution of intermediate language (IL) code generated from any one of several programming languages, and the CLR allows these different IL code components to share common object-oriented classes written in any of the supported languages—for example, the CLR allows an instance of a class written in one language to call a method of a class written in another language. Moreover, programs compiled for the CLR do not need a language-specific execution environment, and these programs can easily be moved and executed on any system with CLR support.

Programmers developing code in Visual Basic, Visual C++, or C# compile their programs into intermediate language code called Common Intermediate Language (CIL) in a portable execution (PE) file that can then be managed and executed by the CLR. The programmer and the environment specify descriptive information about the program when it is compiled and the information is stored with the compiled program as metadata. This metadata, stored in the CIL compiled program, tells the CLR what language was used, its version, and what class libraries will be needed by the program for execution.

The CLR also provides services, such as automatic memory management, garbage collecting (returning unneeded memory to the computer), exception handling, and debugging, and thus provides a powerful yet easy-to-use programming model. The CLR is sometimes referred to as a "managed execution environment" (MEE), and the IL code that executes within the CLR is called managed code. Currently a CLR running on a server that also hosts a DBMS is problematic because the CLR can compromise the reliability, scalability, security, and robustness of the DBMS. For example, when operating independently on the same server, both the DBMS and CLR manage memory, threads, and synchronization between multiple threads, and sometimes conflicts can result. Various embodiments of the present invention provides a solution to this problem.

In computer programming, a connection is the setting up of resources (such as computer memory and buffers) so that a particular object such as a database or file can be read or written to. Typically, a programmer encodes an OPEN or similar request to the operating system that ensures that system resources such as memory are set up, encodes READs and WRITES or similar requests, and then encodes a CLOSE when a connection is no longer needed so that the resources are returned to the system for other users.

Previous releases of SQL Server provided extensibility through extended stored procedures. To access data from the local instance developers had to use a data access API (ODBC/OLEDB) to loop back to the server and perform data access being agnostic to the condition of running inproc as part of an already established connection.

In a database, procedures and functions performs a distinct service. The language statement that requests the function is called a function call. Programming languages usually come with a compiler and a set of "canned" functions that a programmer can specify by writing language statements. These provided functions are sometimes referred to as library routines. Some functions are self-sufficient and can return results to the requesting program without help. Other functions need to make requests of the operating system in order to perform their work.

In a database, a trigger is a set of Structured Query Language (SQL) statements that automatically "fires off" an action when a specific operation, such as changing data in a table, occurs. A trigger consists of an event (an INSERT, DELETE, or UPDATE statement issued against an associated table) and an action (the related procedure). Triggers are used to preserve data integrity by checking on or changing data in a consistent manner.

T-SQL (Transact-SQL) is a set of programming extensions that add several features to the Structured Query Language (SQL) including transaction control, exception and error handling, row processing, and declared variables. Microsoft's SQL Server and Sybase's SQL server support T-SQL statements.

Heretofore, to run application code in a relational database management system (RDBMS), such code had to be Transact-SQL (TSQL) code. The alternative was for an application run its code in its current location and call-up the data it was processing, row by row, from the corresponding database. Neither approach is efficient, and what is needed is an alternative approach that is both efficient and effective.

SUMMARY OF THE INVENTION

Various embodiments of the present invention enable functions, procedures, and triggers to be written in any of the .NET languages and executed by the RDBMS. User code can access data from the local or other SQL servers using the SQL Programming Model and both the SqlServer or SqlClient implementations respectively.

To improve upon the previous extensibility mechanism, a set of APIs (commonly known as "the in-process provider" or "inproc provider") was developed to provide efficient and easy to use data access while running inproc. As a whole, the inproc provider is a very easy to use data access API, an implementation of the ADO.net programming model. The present invention utilizes this API in this regard.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
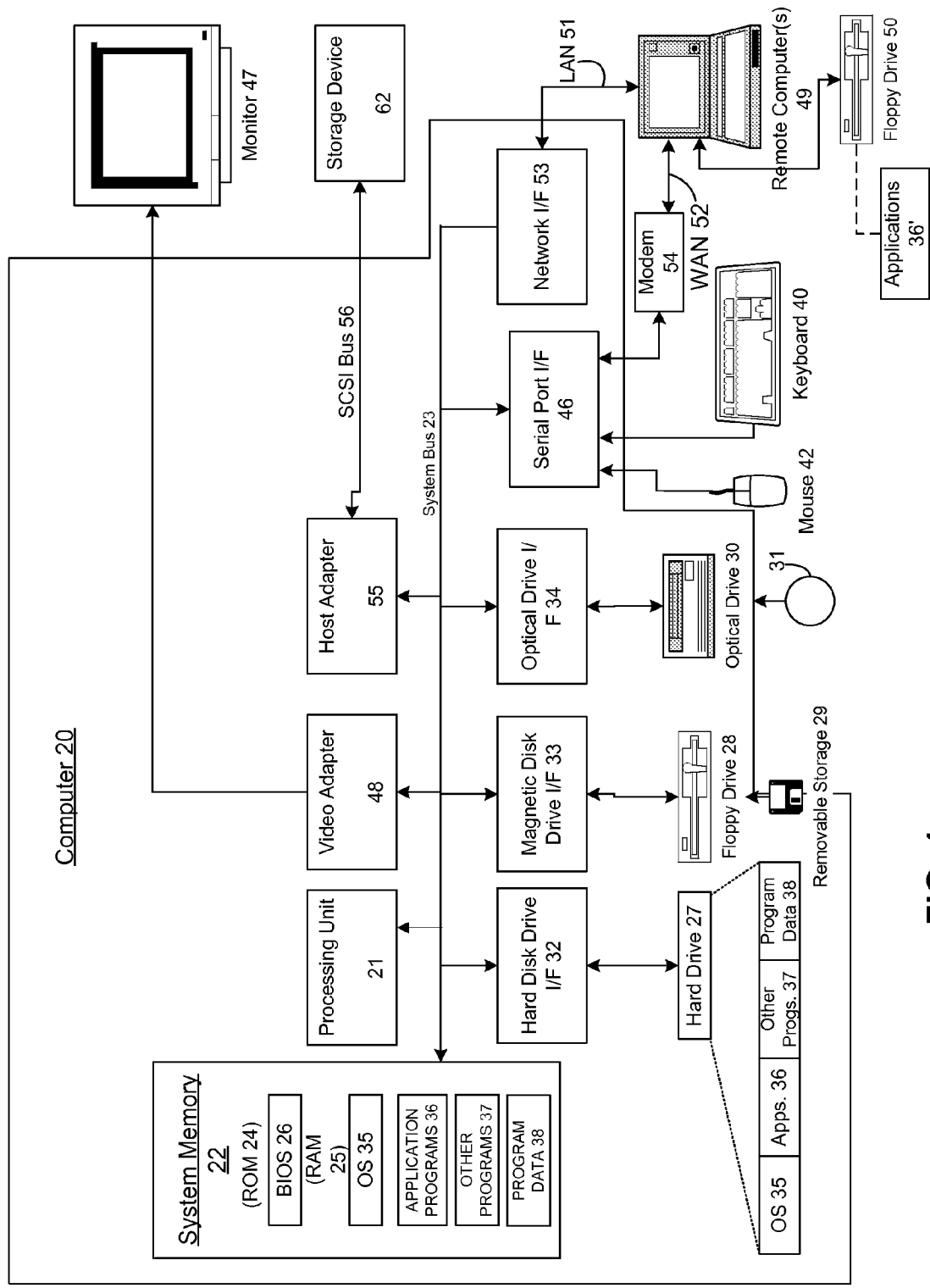
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Networking Environment

Figure 2:
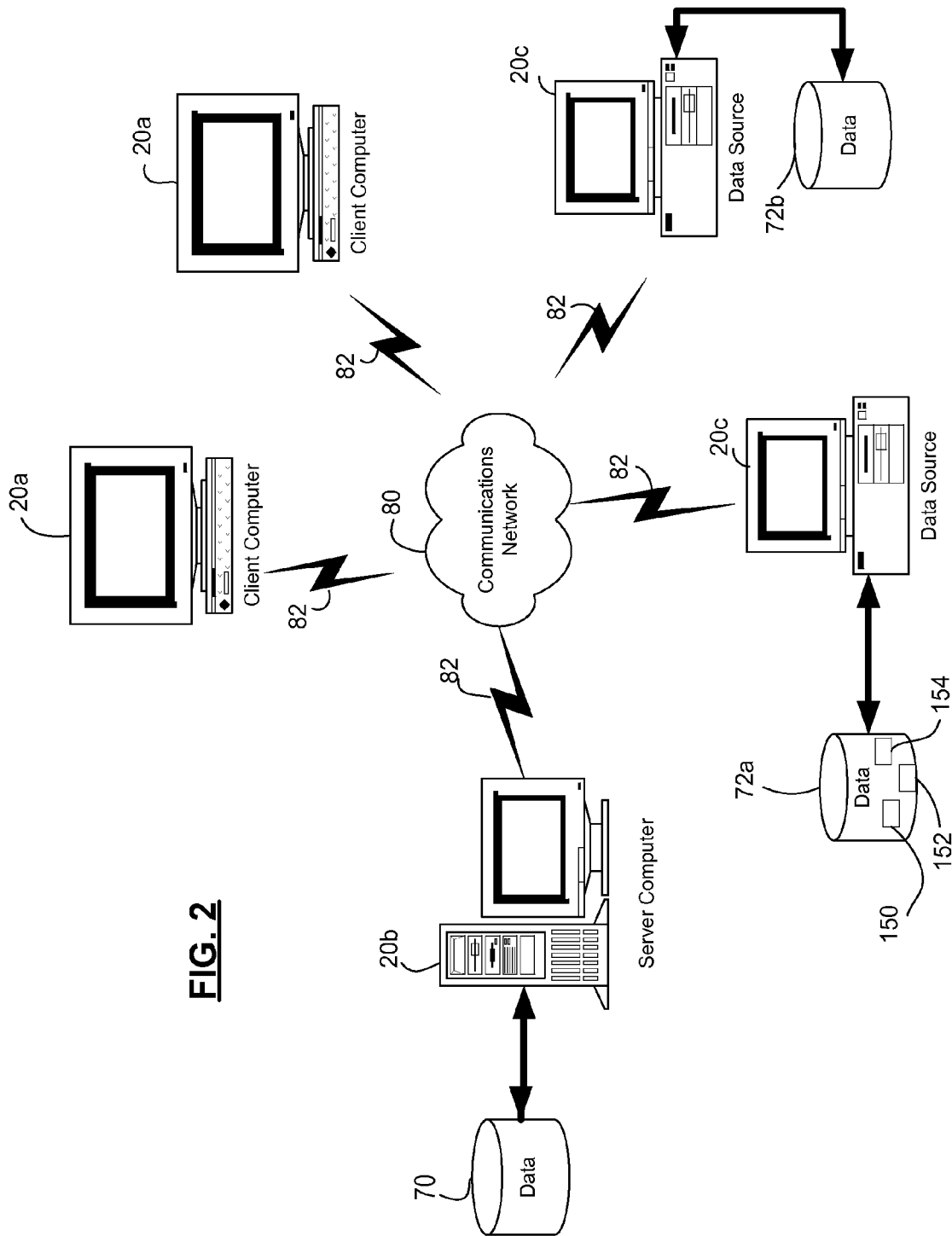
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

In-Process Data Provider

T-SQL (Transact-SQL) is a set of programming extensions that add several features to the Structured Query Language (SQL) including transaction control, exception and error handling, row processing, and declared variables. Microsoft's SQL Server and Sybase's SQL server support T-SQL statements.

Figure 3:
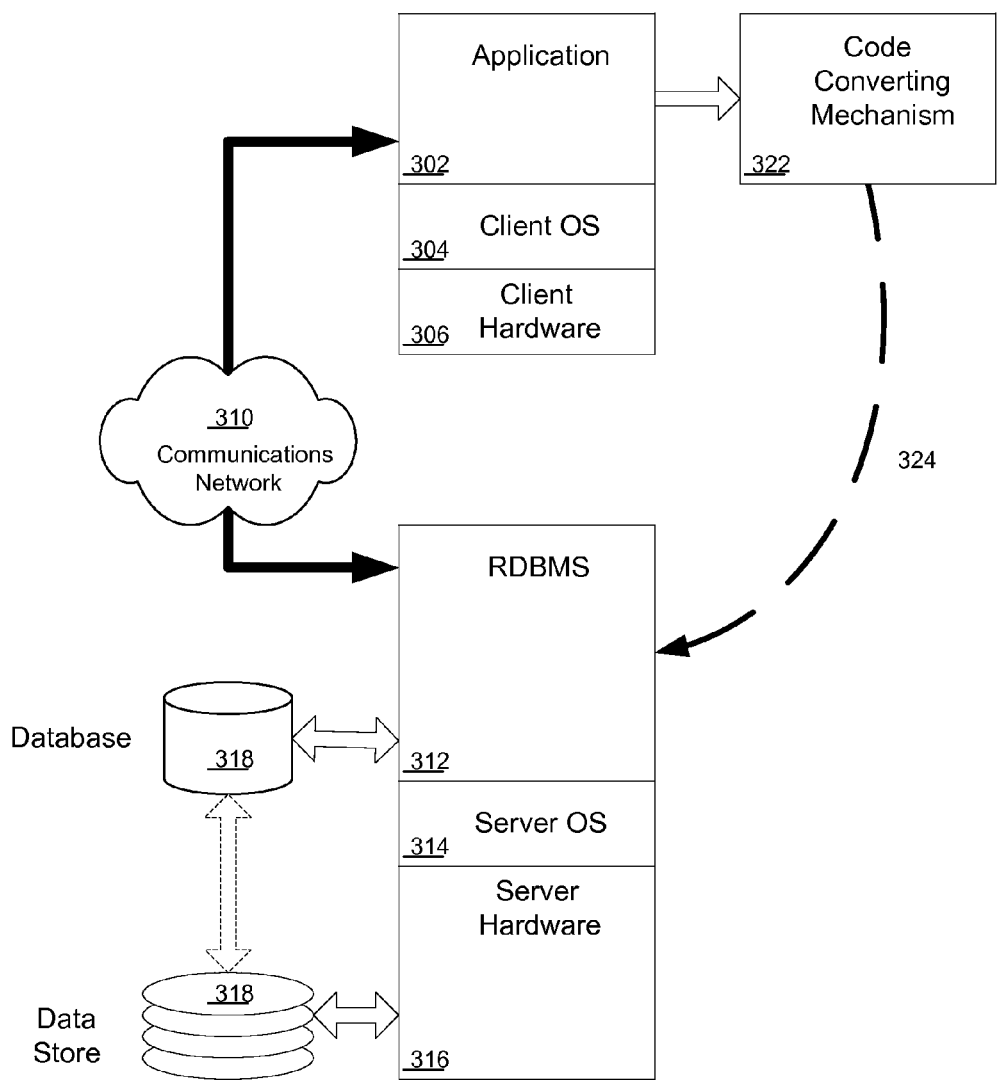
FIG. 3 is a block diagram illustrating the brute-force approach for converting code into TSQL statements for execution in a RDBMS.

Heretofore, to run application code in a relational database management system (RDBMS), such code had to be Transact-SQL (TSQL) code. FIG. 3, which illustrates the brute-force approach for this method, shows an application 302 running on a local operating system 304 on local hardware 306 that, via a network 310, connects with a RDBMS 312 running on a server operating system 314 on server hardware 316 and having a database 318 in, for example, a persistent data store 320. For the application 302 to run code 308 on the RDBMS 312, said code 308 must be converted into TSQL code 308' by some code-converting method/mechanism 322 that may include manual coverting, automated converting, or the like; however, conversion is time-consuming, prone to errors, and provides no mechanism (denoted by 324) for easy introduction of the converted TSQL code 308' into the RDBMS 312.

Figure 4:
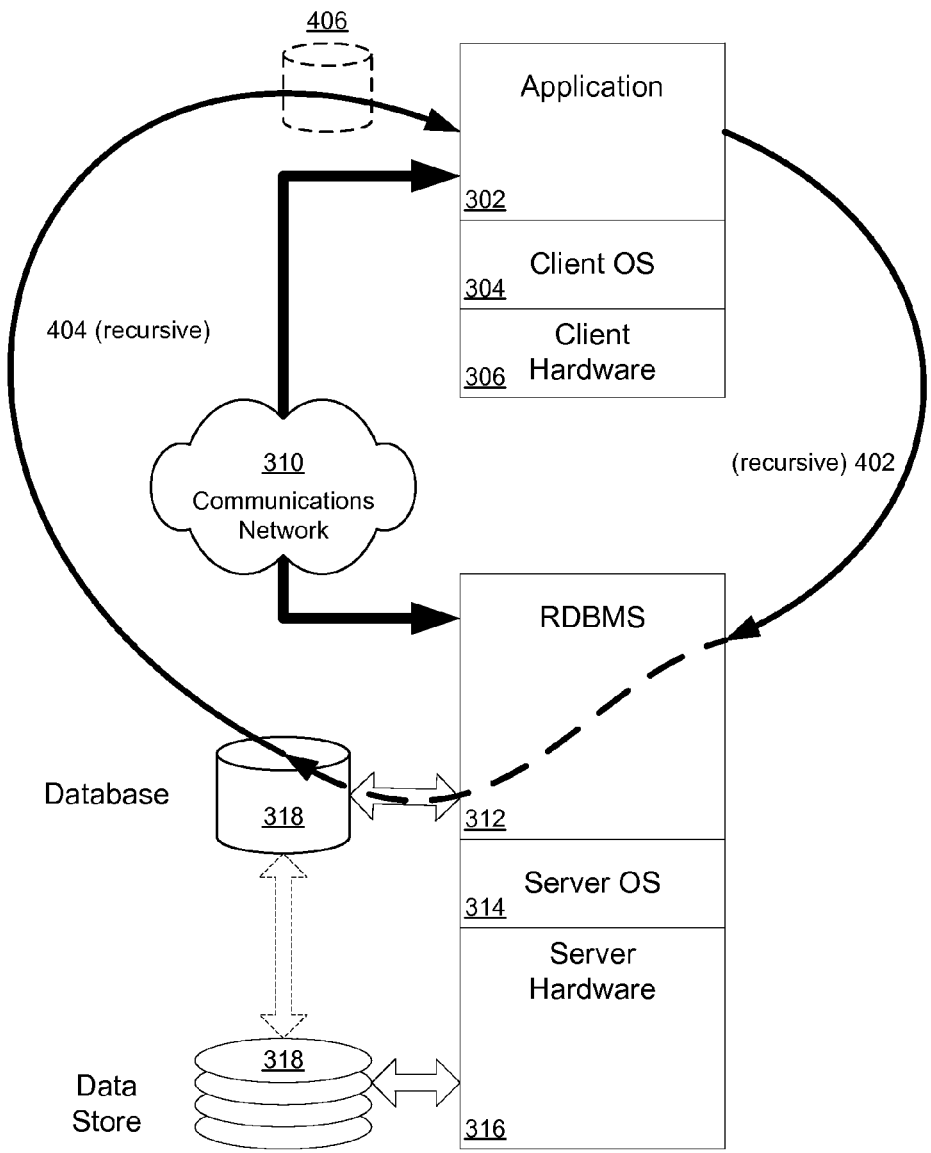
FIG. 4 is a block diagram illustrating the row-by-row approach to copying the necessary data up to the application for local processing.

One alternative is for an application to run its code in its current location and call-up the data it was processing, row by row, from the corresponding database. This method is illustrated in the block diagram of FIG. 4 where an application 302 calls 402 for a first data row 432 via the network 310 from the RDBMS 312, and the RDBMS transmits 404 the first row (not shown) from the database 318 to the application 302 via the network 310 for the application 302 to process. The application then repeats this process for each subsequent row until the entirety of data needed is requested downstream and returned upstream in the system to replicate the data at the applications location 406—a very inefficient and ineffective approach.

Figure 5:
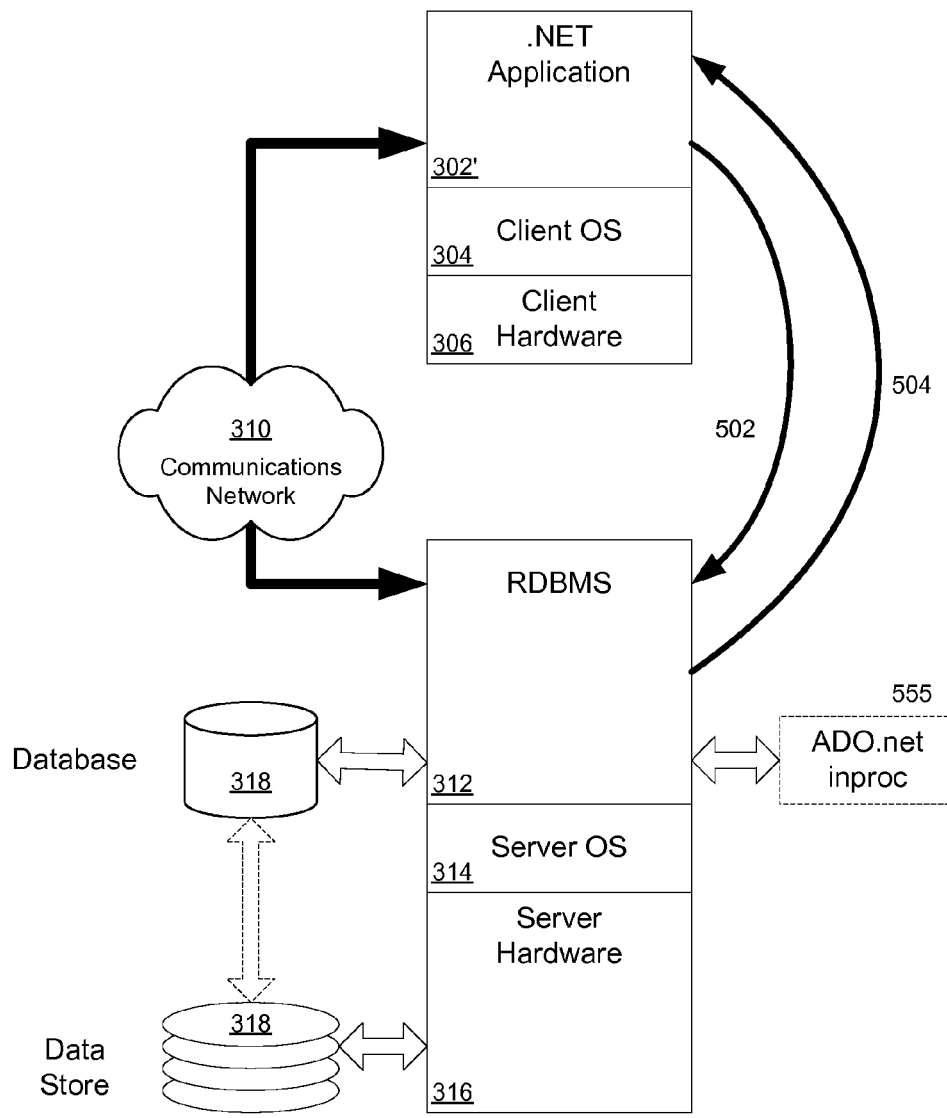
FIG. 5 is a block diagram illustrating the method of various embodiments of the present invention to transmit .NET code from an application to a RDBMS for direct execution and return of results to said application.

Various embodiments of the present invention are directed to enabling functions, procedures, and triggers written in any of the .NET languages to be executed directly in the RDBMS. User code can access data from the local or other SQL servers using the SQL Programming Model and both the SqlServer or SqlClient implementations respectively. As illustrated in FIG. 5, the .NET application 302' submits 502 its code through the network 310 directly to the RDBMS 312—the functionality of which is enhanced with the ADO.NET in-process provider 555—for execution on the database 318 and the result (if any), when completed, is transmitted 504 from the RDBMS 312 via the network 310 to the .NET application 302'.

In this way, functions, procedures, and triggers can be written in any of the .Net languages, and this invention provides for a programming model that affords: (1) the acknowledgment of the invocation context and how it was exposed and made available to end users ; and (2) the separation of immutable and mutable parts of a request in order to be able to achieve higher efficiencies.

Invocation Context

For several embodiments of the present invention, managed code may be invoked in the database server whenever a user calls a procedure, calls a function, or whenever a user's action fires a trigger defined in any of the .NET languages. Since execution of this code is requested as part of user connection, it is necessary to have access to the caller's context from the code running in the server as certain data access operations may only be valid if run under the caller's context (e.g., access to inserted and deleted pseudo-tables or lock sharing). In this regard, the caller's context is consolidated and exposed in a single class, SqlContext, that provides access to the following components:

Connection: For a user to send commands to the server that user must first establish a connection, and thus any code running in the server has an associated caller's connection context.

Command: A command sent to the server has a context of execution with state, such as SET options, database context, execution variables, and so forth. This context is exposed in different ways through the APIs, that is, the context is mapped to a statement handle (hstmt) in ODBC, an ICommand and/or ICommandText in OLEDB, and command objects in ADO and ADO.net.

Transaction: Every statement in the server runs in the context of a transaction. It could be either running under an explicitly started transaction, an implicitly started transaction, or a single statement auto transaction.

Pipe: The "pipe" through which requests and results flow to and from the client and server is part of the context. It is made available through the programming model in order for users to be able to send information back.

TriggerContext: Can only be retrieved from a CLR trigger, and provides information about the operation that caused the trigger to fire and a map of the columns that were updated.

Static Requests

For general efficiency, the SQL Server execution model attempts to cache and reuse as much as possible. For stored procedures and functions written in CLR languages, the type of requests executed are generally constant except for a few parameter values that vary by execution. In addition, ithe ADO.net programming model there is no clear separation between execution invariants (that can be cached and reused) and per-execution parameters—that is commands, parameter metadata, and parameter data are all inter-mingled.

For several embodiments of the present invention, changes have been made to the programming model to (a) allow users to construct requests in the way they are familiar with; (b) explicitly identify a request as being "defined and ready for reuse"; and (c) specify at runtime only the information required. To this end, a new type of object, SqlDefinition, is used to represent a "compiled" command, and this object should be thought of as a SqlCommand that is immutable and which holds no runtime state. As such, a SqlDefinition object can be reused across multiple executions. Moreover, to simplify the learning curve for user, certain embodiments allow SqlDefinitions to be created by simply passing a SqlCommand to an a constructor.

With the static part of a request being abstracted into SqlDefinition's, a new CreateCommand( ) overload was added to the SqlConnection object for various embodiments of the present invention, and this overload returns a SqlCommand that is ready to be used by only setting the appropriate input parameter values.

An example of one model for these various embodiments is as follows:

```
public static SqlDefinition PrepareRequest( )
{
    SqlCommand cmd = new SqlCommand( );
    cmd.CommandType=CommandType.Text;
    cmd.CommandText = "INSERT products values (@ProdName);
    SET @ProdId=SCOPE_IDENTITY( )";
        cmd.Parameters.Add(new
SqlParameter("@ProdName"));
        cmd.Parameters[0].SqlDbType=SqlDbType.Nvarchar;
    cmd.Parameters[0].Size=200;
    cmd.Parameters.Add(new SqlParameter("@ProdId"));
        cmd.Parameters[1].Direction=ParameterDirection.Output;
        cmd.Parameters[1].SqlDbType=SqlDbType.Int;
    return new SqlDefinition(cmd);
}
public static ReadOnly SqlDefinition mySP =
PrepareRequest ( );
public static SqlInt32 InsertProduct(SqlString Description,
ref SqlInt32 ProdId)
{
    //Get a SqlCommand given the definition stored in the
above reference
        Using (SqlCommand sp=
SqlContext.GetConnection( ).CreateCommand(mySP))
    {
        //Set the value for the input parameter
        sp.SetSqlString(0, Description);
        //Execute the command
        sp.ExecuteNonQuery(SqlContext.GetTransaction( ));
        //Get the output parameter
        ProdId=sp.GetSqlInt32(1);
    }
}
```

The division between static and dynamic parts of a request allows better caching and reuse of metadata and associated unmanaged structures. Also the model gives a declarative sense to the procedural .Net programming languages, bringing the overall programming model closer to TSQL.

Cursor on "Everything"

The ADO.net API has a DataReader API which exposes a forward-only cursor on top of SQL statement execution results, and this API also exposes a Read( ) method that advances the cursor to the next row. However, in between Read( ) calls, user code needs to be allowed to run, and this API in and of itself does not provide for this ability.

For several embodiments of the present invention, and in order to provide an opportunity for user code to be run between Read( ) calls, all TSQL statements are divided into two groups, "single-steppable" (SS) and "non-single-steppable" (NSS). For SS statements, a row is fetched and buffered (as a shallow copy) and control is returned to the caller unwinding the stack while preserving all state; upon request for the next row, execution state is restored and the next row is processed; and so forth.

For NSS statements, a two-thread pipe model is used such that a second thread is spawned to execute the statement and synchronization is performed between the two threads such that rows that are produced by the second thread (the "subthread") are made available one row at a time to the first thread (the "user-code-thread").

A special handoff of the transaction context is done in the two-thread pipe model to allow both threads to run under the same transaction. No intra-transaction synchronization is needed though since it is known that, at any given time, at most one of the two threads will be executing. Therefore, based on the steppability of the statements, each frame decides at compile time the execution strategy to be used, and the design switches between the two execution modes giving full cursor support on all statements yet is completely transparent to the caller.

Lastly, when an NSS statement is in a frame, the whole batch is deemed to be non-steppable and the two-thread pipe model is employed for the entire frame.

Out-of-Process Provider Symmetry

For the in-process provider of the present invention to fully enable the ADO.net programming model in the database, certain functionality must be supported by the API. Therefore, the in-process API is fully symmetrical with the full API as implemented by an out-of-process provider (SqlClient). Thus, for several embodiments of the present invention, one or more of the following features native to the out-of-process provider (SqlClient) are enabled:

MARS: The in-process provider would support more than one pending executing command per connection. This entails the support to have multiple active stacks within a single connection. Conceptually this would enable a tree of stacks in the server within a single client side request. For this to be enabled, the top level server side frame would be assumed to have the "default" execution context, which would be cloned for each starting sub-request. Upon completion of the sub-requests, execution environment would be copied back to the "default" context, exposing semantics consistent to those exposed with top level client-side MARS. Also similar to how it is done for client-side MARS, the in-process provider's multiple stacks will share the transaction context with other substacks.

Autonomous Transactions: The API exposes the standalone concept of a transaction that can be freely associated to one or more requests that are to be executed. Based on the infrastructure provided by the unified transaction framework, the in-process provider would expose multiple top level transactions that can be associated with multiple commands at a given time.

Cancel/Attention: The API exposes the ability to cancel an executing request which maps to the ability to unwind one of the possible substacks and return to the next higher CLR frame.

Debugging: Hooks and debugger stops are included with the in-process provider to notify an attached debugger of the transition between TSQL and CLR frames. In this way, the in-process provider supports mixed debugging that allows end users to seamlessly step between managed code and TSQL.

Data Marshaling

For several embodiments of the present invention, efficient data marshaling is one of the key aspects to the performance achieved by the in-process provider design. In this design, small scalar values are copied from unmanaged to managed space by avoiding all intermediate unnecessary copies. However, the components design for marshaling of large types (MAX data types, XML, and large user-defined types) entaild additional built-in capabilities as follows:

Mutable managed types SqlBytes and SqlChars are created to be able to maximize instance reuse. Mutability enables instances to be reused reducing need for allocations and hence for garbage collection, latency and CPU use.

These types can be backed by unmanaged pointers and/or interfaces. As such, they can be constructed and handed off to the user, and are backed by the unmanaged ILockBytes without need to marshal the entire value into managed space.

For instances that are writable, SqlBytes and/or SqlChars implement a copy-on-write mechanism such that only the unamanged reference is wrapped but, upon an intent to change the underlying value, a copy is triggered and the mutation is performed entirely on managed space.

A similar copy-on-write mechanism is implemented for parameter passing of large values.

In general the in-process provider keeps track of unmanaged data being referenced from managed space, and prevents access of this data outside of the intended managed frame.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A computer-implemented method, comprising:
running, on a computer system, a database management system, the database management system configured to process queries generated in a native query language for the database management system;
running, on the computer system, a runtime environment configured to manage execution of intermediate language code;
establishing a connection to a client, the client associated with a set of database access privileges;
receiving, from the client, a query that invokes intermediate language code;
compiling by the runtime environment during a runtime of the database management system, the intermediate language code into an expression encoded in the native query language;
generating a context object including information comprising the set of database access privileges, a connection context of the client, a command context of the client, a transaction context of the client, a pipe context of the client, and a trigger context of the client;
exposing the context object to the database management system through a utilization of an in-process provider, the in-process provider keeps track of data obtained from the database management system that is referenced from the runtime environment and prevents access of the database management data outside a runtime environment execution frame;
executing the expression encoded in the native query language based on the context object; and
storing information indicative of a result of the query in memory.

2. The method of claim 1 further comprising:
providing a cursor associated with the query.

3. The method of claim 1 further comprising:
marshaling data between the runtime environment and the database management system.

4. The method of claim 1, further comprising:
running an application operation selected from a group of operations comprising functions, procedures, and triggers is directly in the database management system.

5. The method of claim 1, wherein the in-process provider supports more than one pending executing command for the connection to the client.

6. A system for executing application code in a database management system (DBMS), the system comprising:
a processor; and
a memory coupled to the processor, the memory including instructions stored therein that upon execution cause the processor to:
run a database management system, the database management system configured to process queries generated in a native query language;
run a runtime environment configured to manage execution of intermediate language code;
establishing a connection to a client, the client associated with a set of database access privileges;
receive a query that invokes intermediate language code from the client;
compile by the runtime environment, the intermediate language code into an expression encoded in the native query language;
generate a context object including information comprising the set of database access privileges, a connection context of the client, a command context of the client, a transaction context of the client, a pipe context of the client, and a trigger context of the client;
expose the context object to the database management system through a utilization of an in-process provider, the in-process provider keeps track of data obtained from the database management system that is referenced from the runtime environment and prevents access of the database management data outside a runtime environment execution frame;
execute the expression encoded in the native query language based on the context object.

7. The system of claim 6, wherein the memory further comprises instructions that upon execution cause the computer system to:
provide a cursor for the query.

8. The system of claim 6, wherein the memory further comprises instructions that upon execution cause the computer system to:
marshal data between the runtime environment and the database management system.

9. The system of claim 6, wherein the memory further comprises instructions that upon execution cause the computer system to:
run an application operation selected from a group of operations comprising functions, procedures, and triggers encoded in the native query language directly in the database management system.

10. The system of claim 6, wherein the context object further comprises:
a command with a state execution context;
the transaction context of the client associated with a command;
a path through which requests and results may be sent or received between the client and the database management system; and
a forward-only cursor on top of statement execution results.

11. The system of claim 6, wherein the in-process provider supports for more than one pending executing command for the connection to the client.

12. A computer-readable storage medium comprising computer-readable instructions stored thereon that upon execution by a processor of a computer system cause the computer system to:
- run a database management system, the database management system configured to process queries generated in a native query language;
- run a runtime environment configured to manage execution of intermediate language code;
- establish a connection to a client, the client associated with a set of database access privileges;
- receive a query that invokes intermediate language code from the client;
- compile by the runtime environment, the intermediate language code into an expression encoded in the native query language;
- generate a context object including the set of database access privileges, a connection context of a client, a command context of the client, a transaction context of the client, a pipe context of the client, and a trigger context of the client;
- expose the context object to the database management system through a utilization of an in-process provider, the in-process provider keeps track of data obtained from the database management system that is referenced from the runtime environment and prevents access of the database management data outside a runtime environment execution frame; and
- execute the expression encoded in the native query language based on the context object.

13. The computer-readable storage medium of claim 12 further comprising instructions that upon execution cause the computer system to:
- provide a cursor on any type of query executed.

14. The computer-readable storage medium of claim 12 further comprising instructions that upon execution cause the computer system to:
- marshal data between the runtime environment and the database management system.

15. The computer-readable storage medium of claim 12 further comprising instructions that upon execution cause the computer system to:
- run an application operation selected from a group of operations comprising functions, procedures, and triggers encoded in the native query language directly in the database management system.

16. The computer-readable instructions of claim 12, wherein context object further comprises:
- a command with a state execution context;
- a transaction context associated with a command;
- a path through which requests and results may be sent or received between the client and the database management system;
- a trigger context, wherein the trigger results from an operation of the client; and
- a forward-only cursor on ton of statement execution results.

17. The computer-readable storage medium of claim 12, wherein the in-process provider supports more than one pending executing command for the connection to the client.

* * * * *

UNITED STATES PATENT AND TRADEMARK OFFICE
CERTIFICATE OF CORRECTION

PATENT NO. : 8,112,383 B2  
APPLICATION NO. : 10/776370  
DATED : February 7, 2012  
INVENTOR(S) : Alazel Acheson et al.

Page 1 of 1

It is certified that error appears in the above-identified patent and that said Letters Patent is hereby corrected as shown below:

On the Title Page  
Item (75), under "Inventors" line 9, delete "Girkumar" and insert -- Girikumar --, therefor.

In column 16, line 26, in Claim 16, delete "ton" and insert -- top --, therefor.

Signed and Sealed this  
Twentieth Day of March, 2012

David J. Kappos  
*Director of the United States Patent and Trademark Office*